(12) United States Patent
Campbell et al.

(10) Patent No.: US 7,124,642 B2
(45) Date of Patent: Oct. 24, 2006

(54) DUAL GAUGE WITH DUAL CALIBRATION SYSTEM AND METHOD

(75) Inventors: Sidney R. Campbell, Sherwood, OR (US); Tyler R. M. Kope, Seattle, WA (US)

(73) Assignee: Right Weigh, Inc., Sherwood, OR (US)

( * ) Notice: Subject to any disclaimer, the term of this patent is extended or adjusted under 35 U.S.C. 154(b) by 0 days.

(21) Appl. No.: 11/107,388

(22) Filed: Apr. 15, 2005

(65) Prior Publication Data
US 2006/0096382 A1    May 11, 2006

Related U.S. Application Data

(60) Provisional application No. 60/562,936, filed on Apr. 15, 2004.

(51) Int. Cl.
*G01L 7/04* (2006.01)
(52) U.S. Cl. .............................. 73/732; 73/715; 73/736
(58) Field of Classification Search ........... 73/700–756
See application file for complete search history.

(56) References Cited

U.S. PATENT DOCUMENTS

| | | | | | |
|---|---|---|---|---|---|
| 3,956,920 | A | * | 5/1976 | Kollmeyer | .................... 73/725 |
| 4,058,016 | A | * | 11/1977 | Schwartz | ...................... 73/716 |
| 4,916,944 | A | * | 4/1990 | Ho-Chuan | ................. 73/146.8 |
| 5,363,703 | A | * | 11/1994 | Delatorre | ..................... 73/733 |
| 5,652,391 | A | * | 7/1997 | Kingsford et al. | ............ 73/706 |

* cited by examiner

*Primary Examiner*—Edward Lefkowitz
*Assistant Examiner*—Jermaine Jenkins
(74) *Attorney, Agent, or Firm*—Brian L. Johnson; Davis Wright Tremaine LLP (57) ABSTRACT

A dual gauge system determines pressures of two separately contained gases by use of two separate pointer—Bourdon tube sections within the dual gauge. The Bourdon tube of a first one of the sections is gaseously coupled to a first one of the contained gases to determine pressure of the first one of the contained gases and a Bourdon tube of a second one of the sections is gaseously coupled to a second one of the contained gases to determine pressure of the second one of the contained gases. Accuracy of pressure determination is enhanced by allowing for separate calibration of each of the two gauge sections.

9 Claims, 14 Drawing Sheets

DUAL GAUGE WITH DUAL CALIBRATION SYSTEM AND METHOD

BACKGROUND OF THE INVENTION

1. Field of the Invention

The present invention is directed generally to gauges and, more particularly, to mechanical gauges.

2. Description of the Related Art

A mechanical pressure gauge can be used to measure pressure of a contained gas. Typically a pointer is used in the gauge to point to a particular pressure value demarcation on a dial face to indicate present pressure of the contained gas. A Bourdon tube can be used since it is constructed to assume a particular shape supported by pressurized gas inside the Bourdon tube. The Bourdon tube is gaseously coupled to the contained gas so is pressurized at the same pressure of the contained gas. If the pointer is mechanically coupled to the Bourdon tube so that movement of the pointer will properly indicate on the dial face pressure changes of the contained gas, then the pointer need only be positioned on the dial face according to one known pressure reading of the contained gas in order for the gauge to be calibrated and deemed accurate. Some gauges, conventionally known as dual gauges, use two Bourdon tubes each mechanically coupled to a separate pointer so that the two pointers of a dual gauge share a common dial face. Unfortunately, these conventional dual gauges are unable to provide a calibration function for both of their pointers.

DETAILED DESCRIPTION OF THE INVENTION

As will be discussed in greater detail herein, a dual gauge system determines pressures of two separately contained gases by use of two separate pointer—Bourbon tube sections within the dual gauge. The Bourdon tube of a first one of the sections is gaseously coupled to a first one of the contained gases to determine pressure of the first one of the contained gases and a Bourdon tube of a second one of the sections is gaseously coupled to a second one of the contained gases to determine pressure of the second one of the contained gases. Accuracy of pressure determination is enhanced by allowing for separate calibration of each of the two gauge sections as explained further below.

Figure 1:
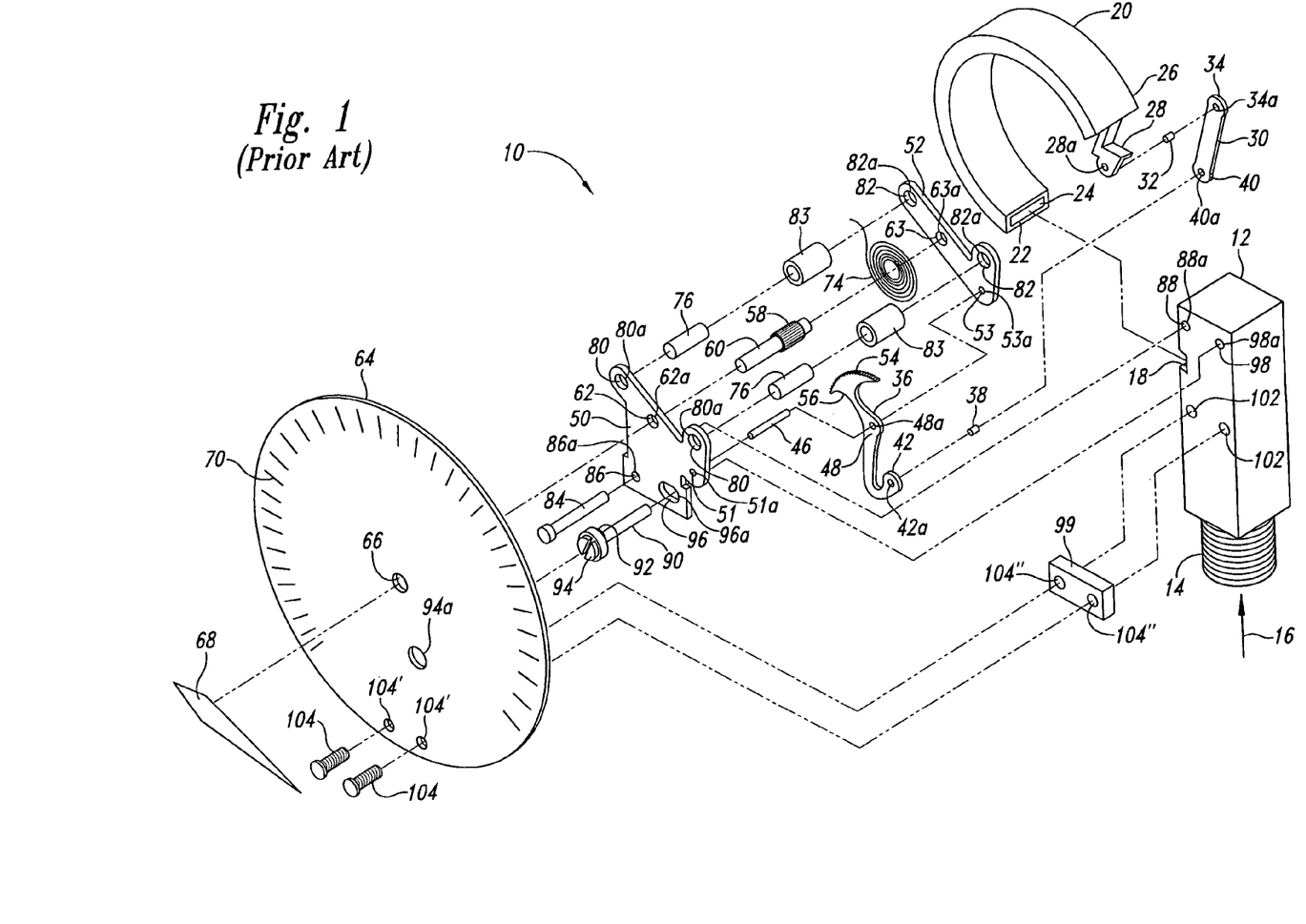
FIG. 1 is an exploded isometric view of a conventional single pointer gauge having one Bourdon tube.

A conventional single pointer gauge 10 is shown in FIG. 1 as having a support 12 with threaded gas inlet 14 receiving pressurized gas 16 and outputting the pressurized gas through an opening (not shown) of a channel 18 to a Bourdon tube 20 fixedly coupled to the channel. A first end 22 of the Bourdon tube 20 has an opening 24 allowing access to the interior of the hollow Bourdon tube to receive the pressurized gas.

The first end 22 of the Bourdon tube 20 is shaped to mate with the channel 18 of the support 12 so that the Bourdon tube can be securely coupled to the support. A sealed second end 26 of the Bourdon tube 20 is fixedly coupled to a link attachment 28, which is rotatably coupled to a linkage 30 with a pin 32 through a passageway 28a of the attachment and a passageway 34a of a first end 34 of the linkage. The linkage 30 is rotatably coupled to a lever arm 36 with a pin 38 through a passageway 40a of a second end 40 of the linkage and a passageway 42a of a first end 42 of the lever arm. The lever arm 36 is fixedly coupled to a shaft 46 through a passageway 48a in a mid-portion 48 of the lever arm.

The shaft 46 is rotatably coupled to a first bracket 50 through a passageway 51a at a first position 51 of the first bracket. The shaft 46 is rotatably coupled to a second bracket 52 through a passageway 53a at a first position 53 of the second bracket. The lever arm 36 has a rack gear 54 positioned at a second end 56 of the lever arm that engages with a pinion gear 58 on a shaft 60. The shaft 60 is rotatably coupled to the first bracket 50 through a passageway 62a at a second position 62 of the first bracket and is rotatably coupled to the second bracket 52 through a passageway 63a at a second position 63. When the conventional single pointer gauge 10 is assembled, the shaft 60 extends through the first bracket 50 and further extends through a dial face 64 at a first position 66.

The shaft 60 is fixedly coupled to a pointer 68, which indicates pressure by pointing to one of a series of pressure value demarcations 70 displayed on the dial face 64. The shaft 60 is secured from vibrational movement by a biasing spring 74. The first bracket 50 and the second bracket 52 are fixedly coupled together with pins 76 coupled through passageways 80a at second positions 80 of the first bracket and coupled through passageways 82a at second positions 82 of the second bracket. Distance between the first bracket 50 and the second bracket 52 is maintained by collars 83 being positioned on the pins 76 between the first bracket and the second bracket. The first bracket 50 is rotatably coupled to a pin 84 wherein the pin extends through a passageway 86a at a third position 86 on the first bracket and fixedly couples to the support 12 through a passageway 88a in a first position 88 on the support.

Figure 2:
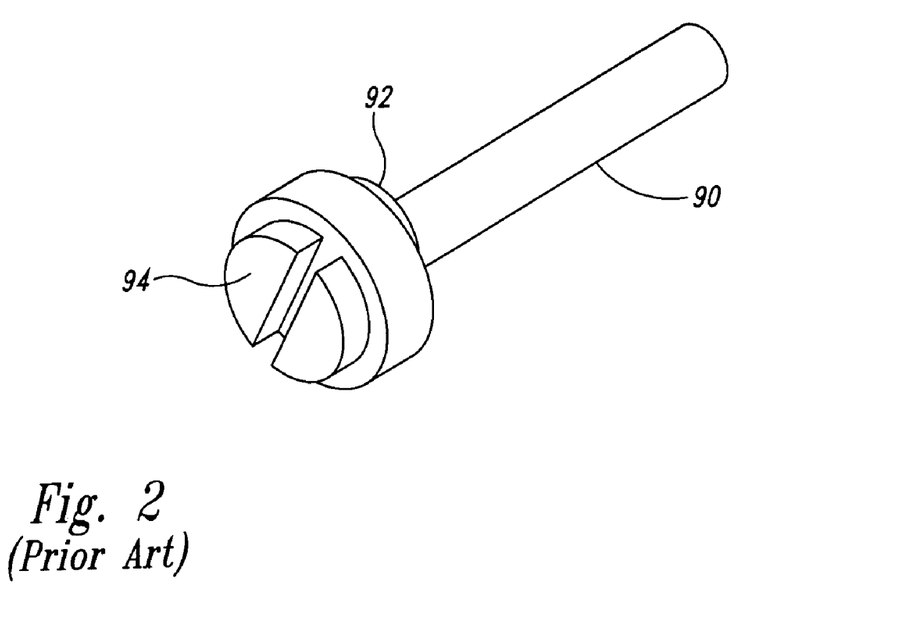
FIG. 2 is an isometric view of a shaft with cam used for calibration of the conventional single pointer gauge of FIG. 1.
Figure 3:
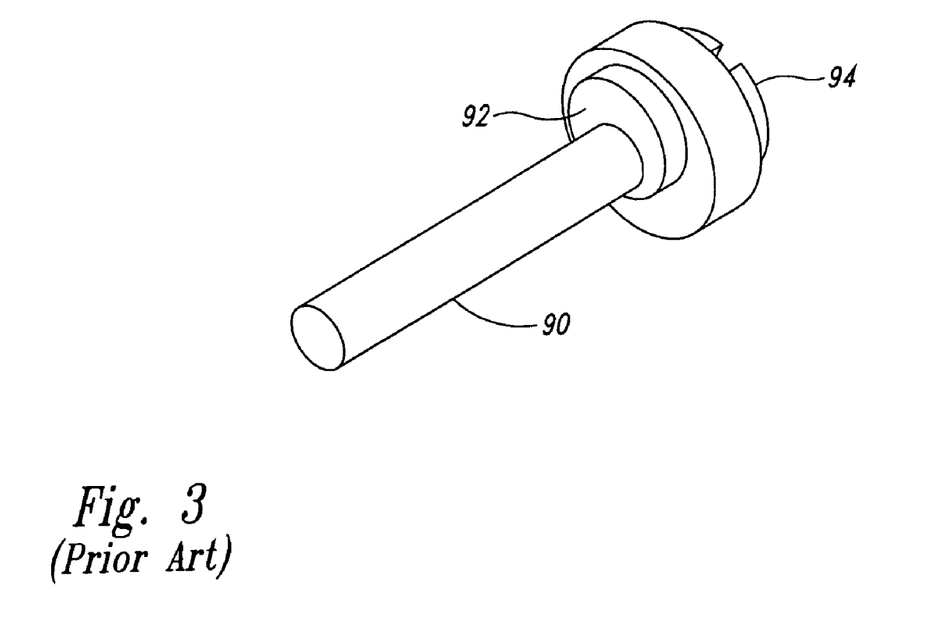
FIG. 3 is an isometric view of the shaft with cam of FIG. 2 better showing the cam.

A shaft 90 (better shown in FIG. 2 and FIG. 3) with a cam 92 and a screw head 94 extends through an elongated passageway 96a at a fourth position 96 in the first bracket 50 to be rotatably coupled to the support 12 through a passageway 98a at a second position 98 in the support. The head 94 of the shaft 90 extends through a passageway 94a in the dial face 64 to be accessible for calibration of the gauge 10. The cam 92 of the shaft 90 engages the first bracket 50 at the elongated passageway 96a so that as the shaft is rotated, the first bracket will rotate about the pin 84. Angular positioning of the first bracket 50 about the pin 84 will determine location of the pointer 68 on the dial face 64 for a given shape of the Bourdon tube 20 thereby allowing calibration of the gauge 10 through repositioning of the various elements that implement motion conversion of shape change of the Bourdon tube 20 into rotation of the shaft 60. This calibration adjustment is provided since rotation of the shaft 90 and subsequent change in angular position of the first bracket 50 about the pin 84 will change the position of the passageway 48a of the lever arm 36 relative to the position of the passageway 28a in the link attachment 28. As the position of the passageway 48a changes relative to the passageway 28a, the rotational position of the lever arm 36 also changes with respect to a given shape of the Bourdon tube 20. Consequently, the pinion gear 58 will rotate with the change in rotational position of the lever arm 36 causing the pointer 68 to change position as the Bourdon tube 20 retains the given shape. For mounting of the dial face 64, a spacer 99 is fixedly coupled to the support 12 at attachment points 102 by use of screws 104 placed through passageways 104' in the dial face 64 and passageways 104" in the spacer.

Figure 4:
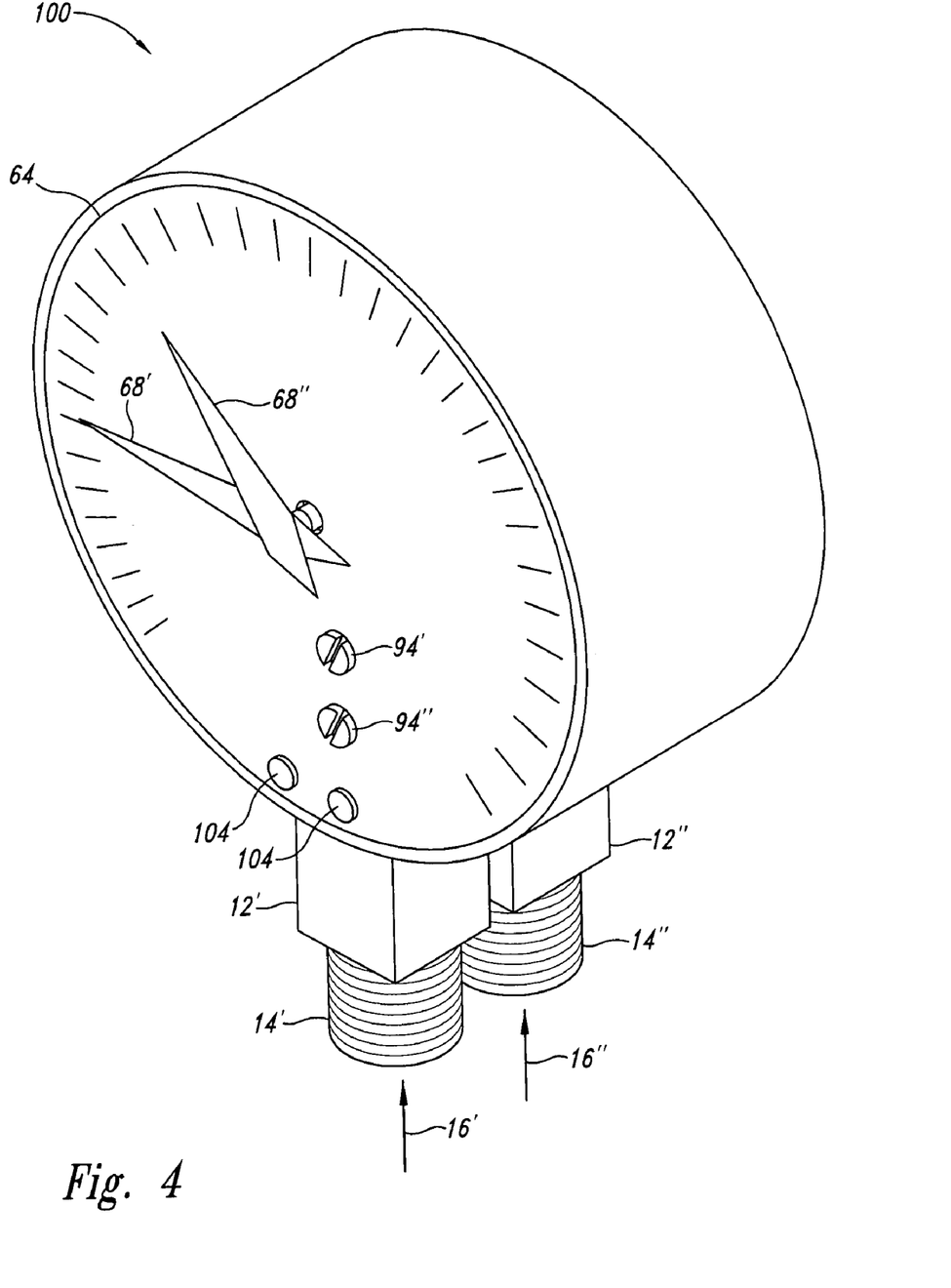
FIG. 4 is an isometric view of a dial face of a dual pointer gauge with dual calibration.

A dual calibration gauge 100 is shown in FIG. 4 as having a first pointer 68' indicating on the dial face 64 pressure of a first gas 16' entering a first gas inlet 14' of a first support 12'. The dual calibration gauge 100 also includes a second pointer 68" indicating on the dial face 64 pressure of a second gas 16" entering a second gas inlet 14" of a second support 12". A first screw head 94' is used to calibrate positioning of the first pointer 68' and a second screw head 94" is used to calibrate positioning of the second pointer 68". In some implementations, the first screw head 94', the first gas inlet 14', and the first pointer 68' have a first color such as by being painted the first color or by being colored by some other way whereas the second screw head 94", the second gas inlet 14", and the second pointer 68" have a second color different than the first color for identification purposes.

Figure 5:
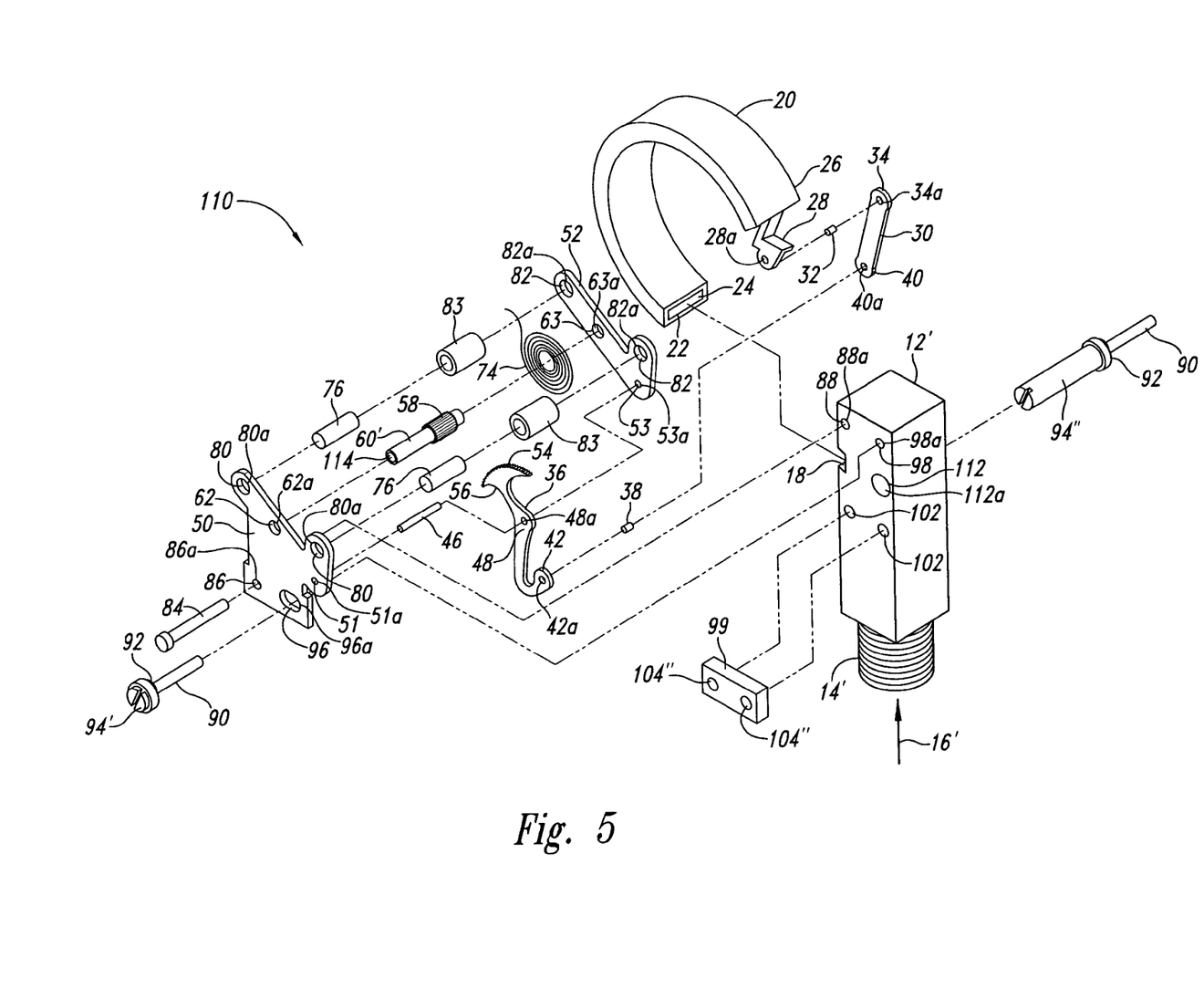
FIG. 5 is an exploded isometric view of a first section of components associated with a first support of the dual gauge of FIG. 4.
Figure 6:
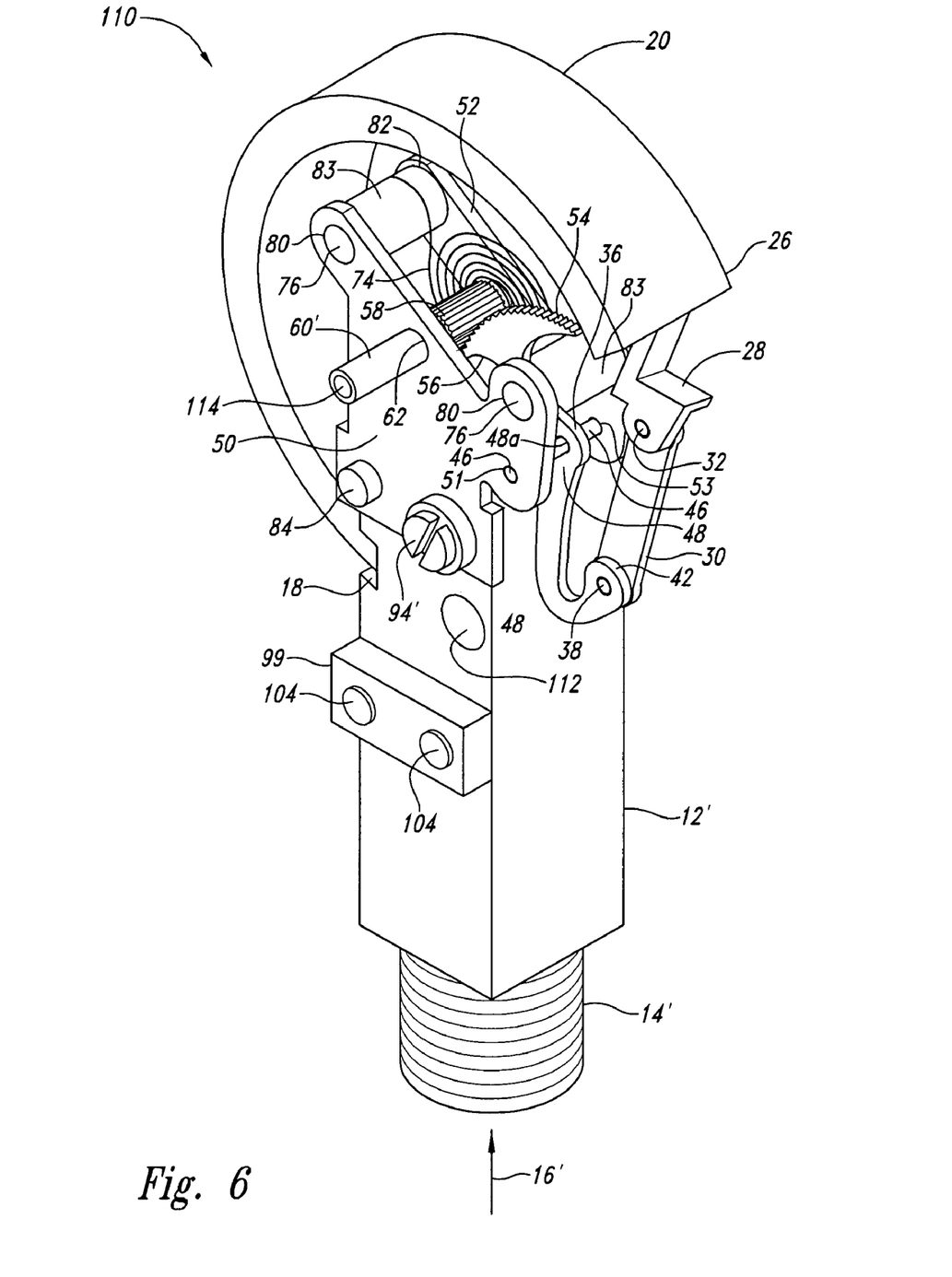
FIG. 6 is an isometric view of the first section of components shown in FIG. 5 as assembled.

A first section 110 of components of the dual gauge 100 to measure pressure of the first gas 16' is shown in FIGS. 5 and 6. The first section 110 has the first support 12', which includes an access passageway 112a in a third position 112 that receives and allows access to the second screw head 94" from the dial face 64. The first section 110 also includes a first shaft 60' similar to the shaft 60 except that the first shaft is hollow so has a cylindrical passageway 114.

Figure 7:
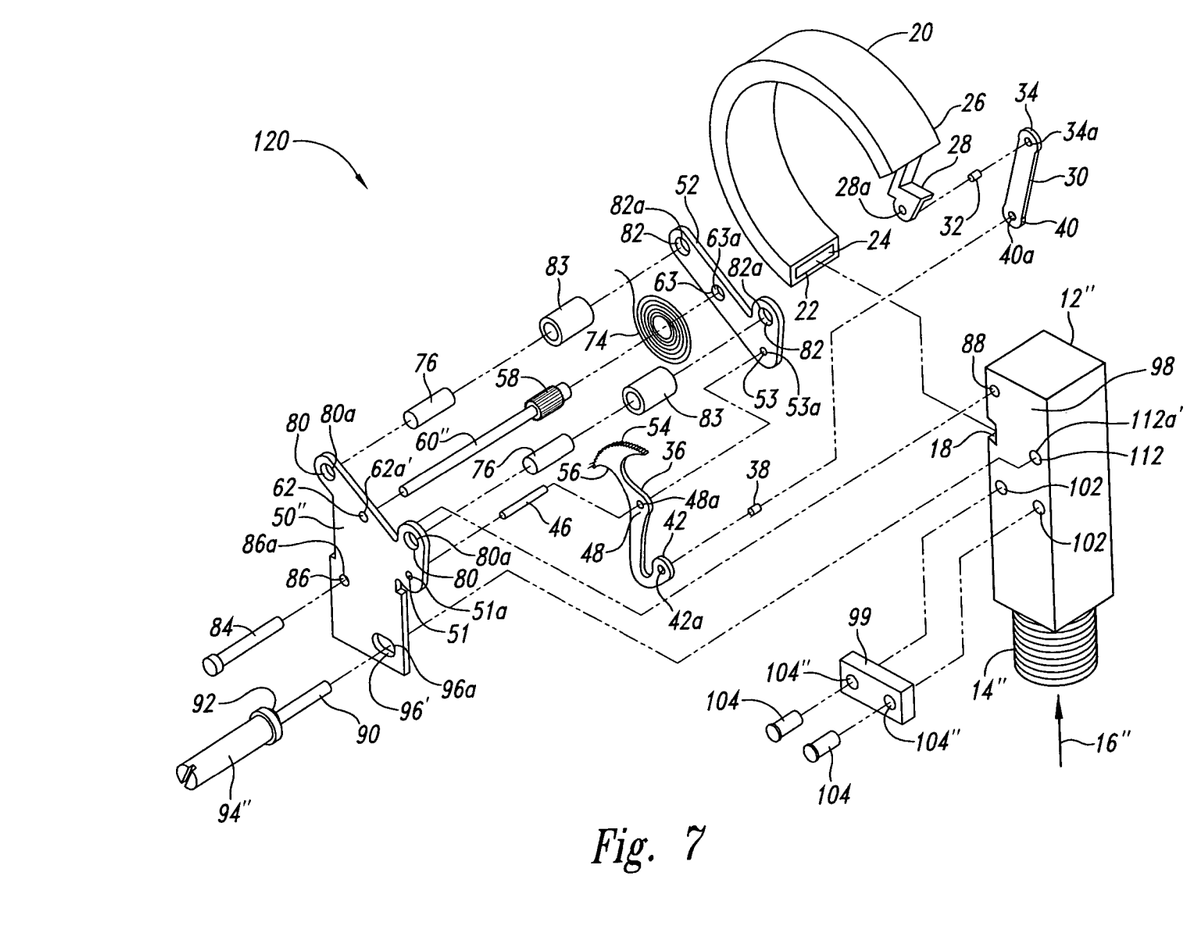
FIG. 7 is an exploded isometric view of a second section of components associated with a second support of the dual gauge of FIG. 4.
Figure 8:
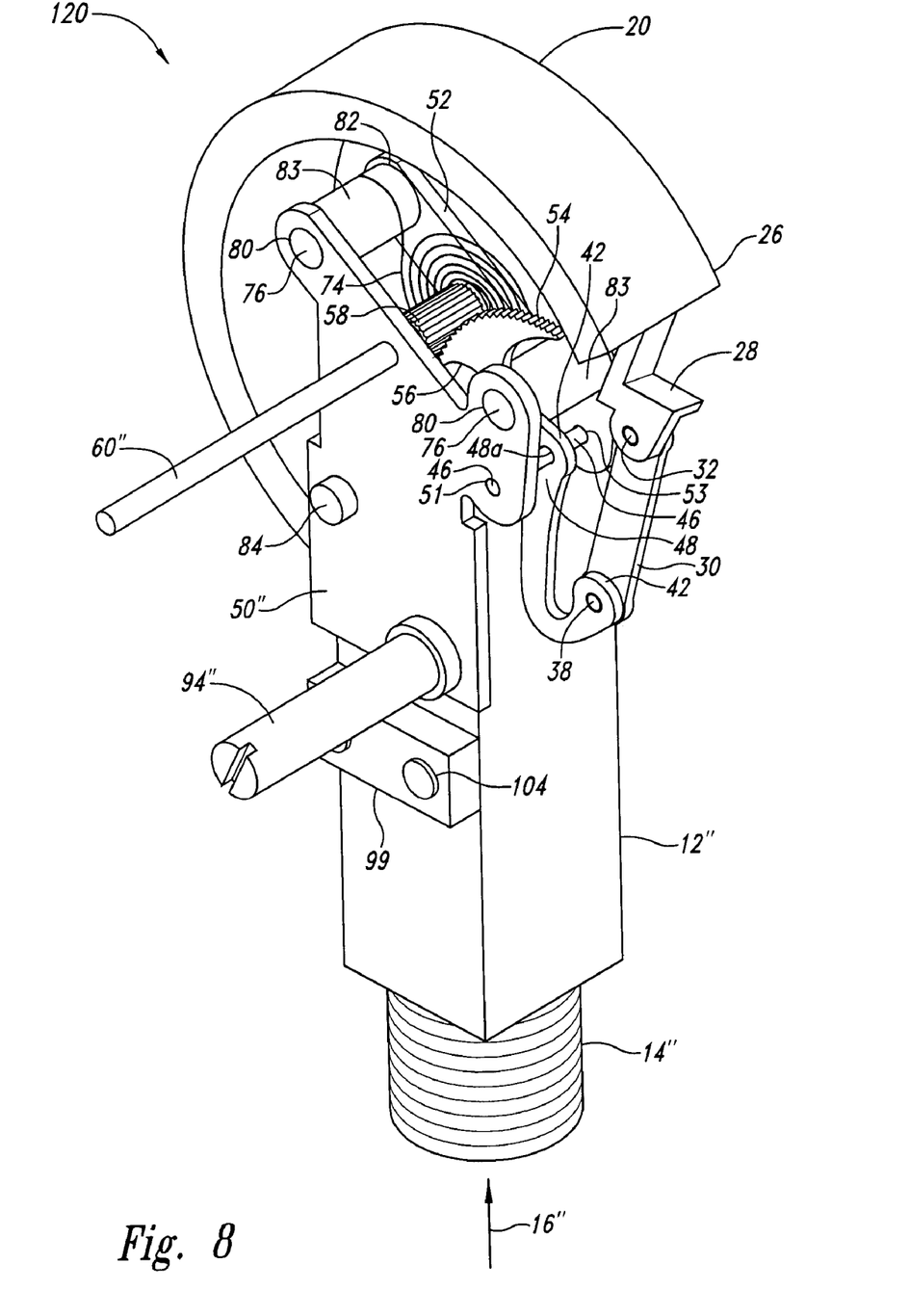
FIG. 8 is an isometric view the second section of components shown in FIG. 7 as assembled.

A second section 120 of components of the dual gauge 100 to measure pressure of the second gas 16" is shown in FIGS. 7 and 8. The second section 110 has the second support 12", which includes a passageway 112a' in the third position 112 that receives the shaft 90 of the second screw head 94". The second support 12" does not include the passageway 98a in the second position 98. The second section 120 includes a shaft 60" having a diameter sufficiently small to pass through the passageway 114 of the first shaft 60' so that the first shaft 60' is fixedly attached to the first pointer 68' and the second shaft 60" is fixedly attached to the second pointer 68".

A first bracket 50" has a passageway 62a' in the second position 62 of a smaller diameter than the passageway 62a in the second position 62 of the first bracket 50 of the first section to receive the smaller diameter shaft 60" of the second section. The first bracket 50" has the elongated passageway 96a in a lower fourth position 96' than the fourth position 96 of the elongated passageway of the first bracket 50 of the first section 110 since the shaft 90 and the screw head 94" of the second section 120 is positioned below the shaft 90 and the screw head 94' of the first section 110.

Figure 9:
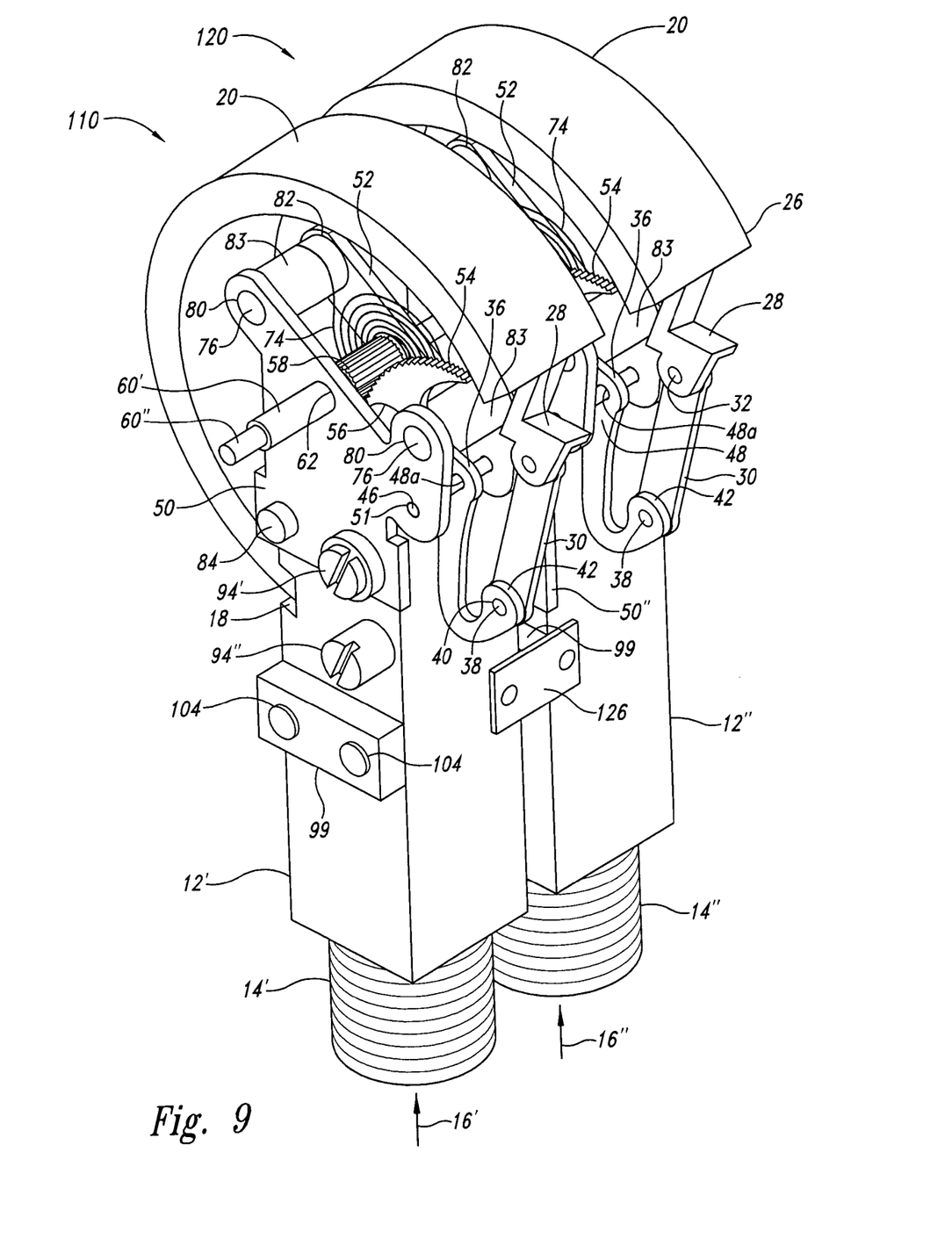
FIG. 9 is an isometric view of the first section of components of FIG. 6 and the second section of components of FIG. 8 as coupled together.

After the first section 110 and the second section 120 are individually assembled, they are joined together, as shown in FIG. 9, using, for instance, a bracket 126. As assembled, the shaft 60" of the second section 120 extends through the shaft 60' of the first section 110. Further, the screw head 94" of the second section 120 extends through the support 12' of the first section.

Figure 10:
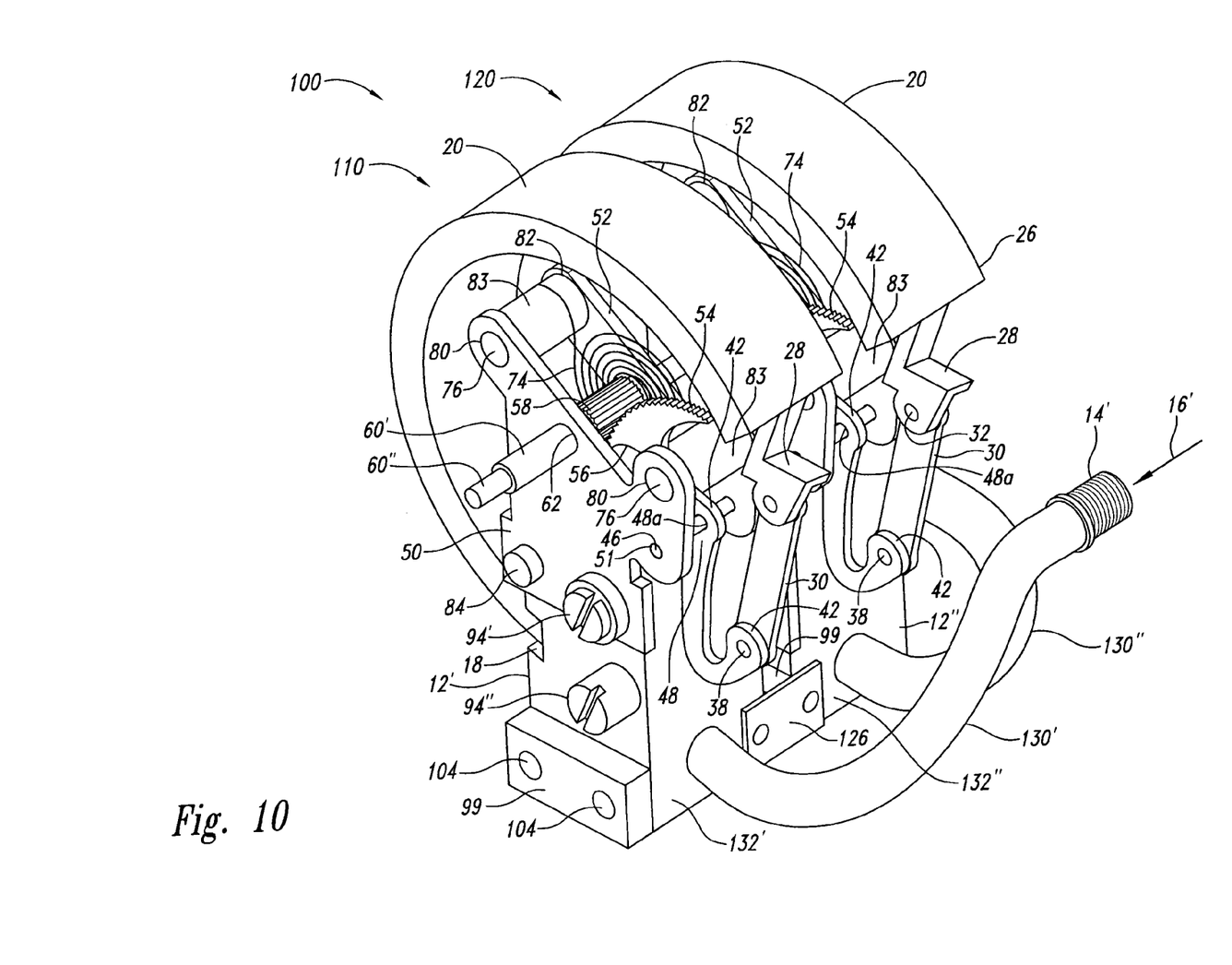
FIG. 10 is an isometric view of a second implementation of the dual gauge using soft tubing.
Figure 11:
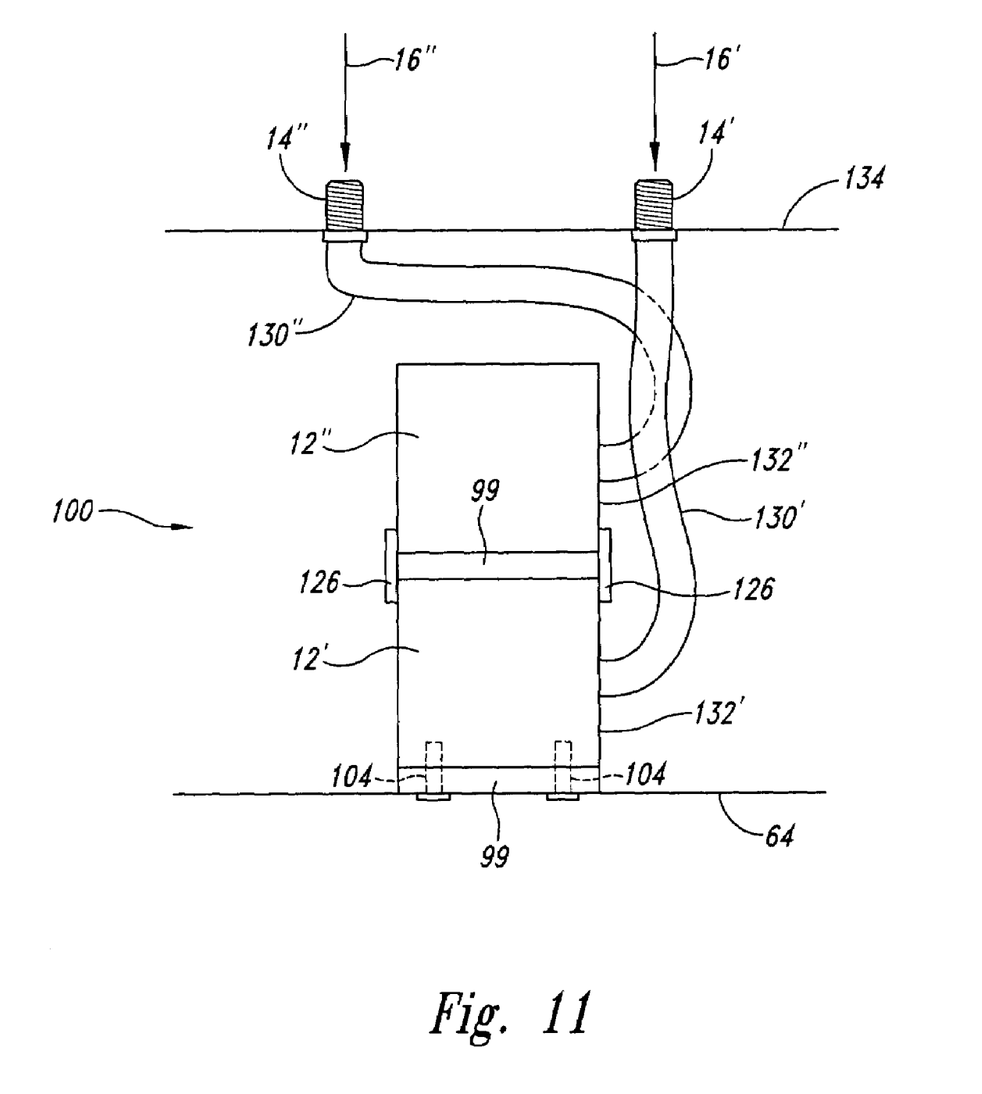
FIG. 11 is a top schematic view of the second implementation of the dual gauge of FIG. 10 showing a first version for routing of the soft tubing.
Figure 12:
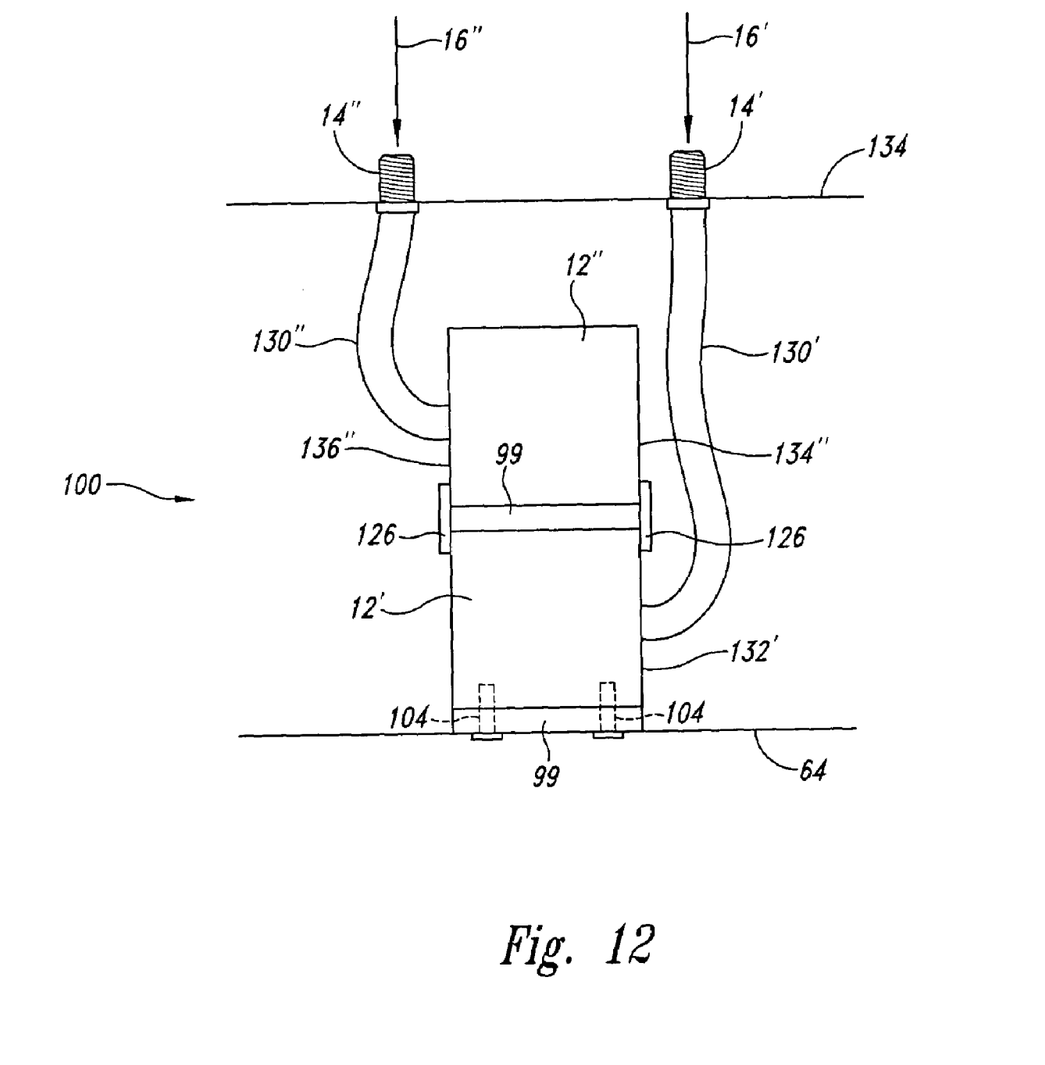
FIG. 12 is a top schematic view of the second implementation of the dual gauge of FIG. 10 showing a second version for routing of the soft tubing.

An alternative implementation of the dual gauge 100, shown in FIG. 10, uses first tubing 130' affixed to a side 132' of the first support 12' and second tubing 130" affixed to a side 132" of the second support 12' to route the first gas inlet 14' and the second gas inlet 14", respectively. As shown in FIG. 11, the first gas inlet 14' and the second gas inlet 14" can be affixed to a wall 134 opposite in direction to the dial face 64. Another implementation in which the second tubing 130" is shortened by being affixed to an opposite side 136" of the second support 12" is shown in FIG. 12. Other implementations using various other routing paths for tubing are further contemplated.

Figure 13:
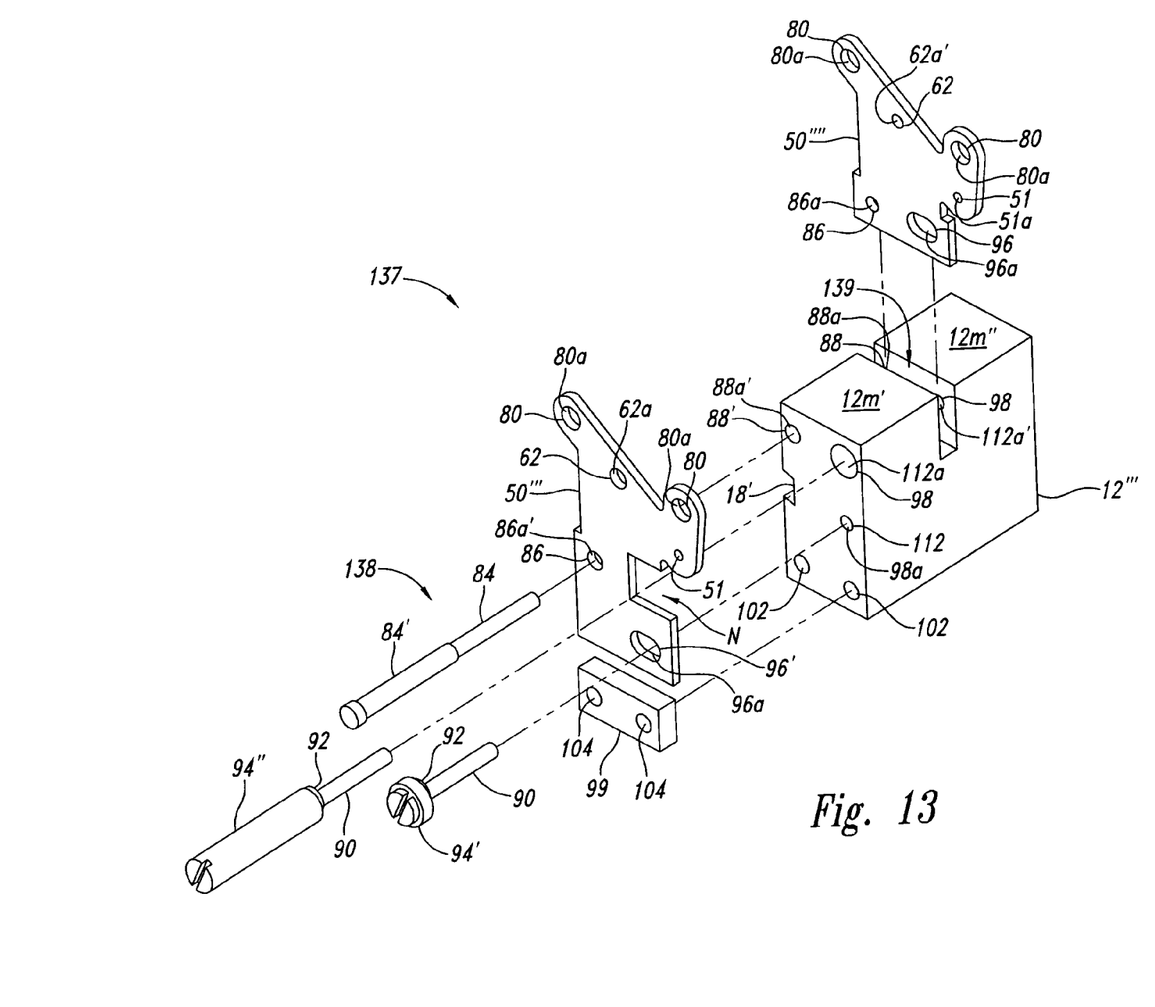
FIG. 13 is an isometric view of components of a third implementation of the dual gauge routing internal gas passageways through a solid body.
Figure 14:
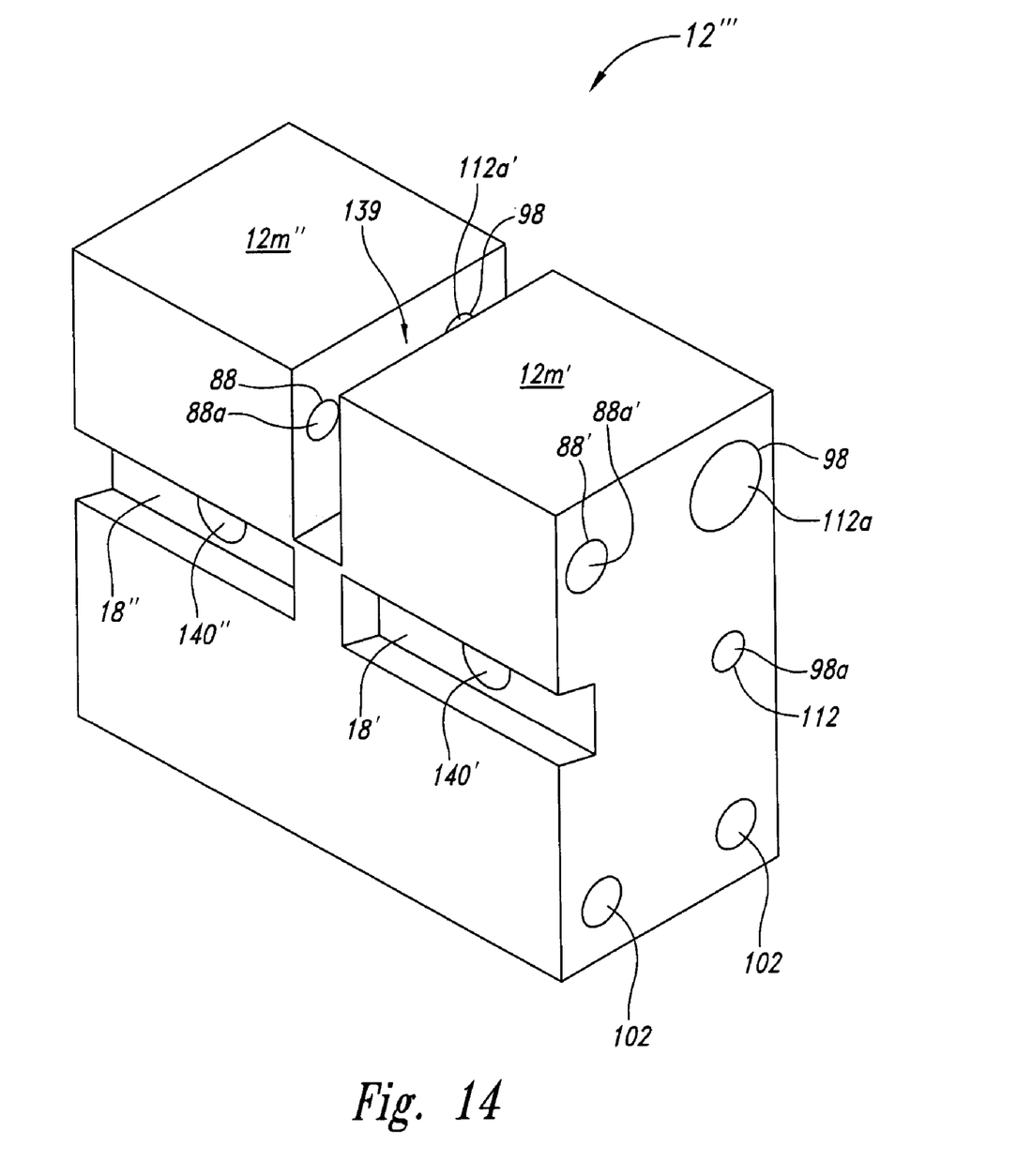
FIG. 14 is an isometric view of the solid body shown in FIG. 13.
Figure 15:
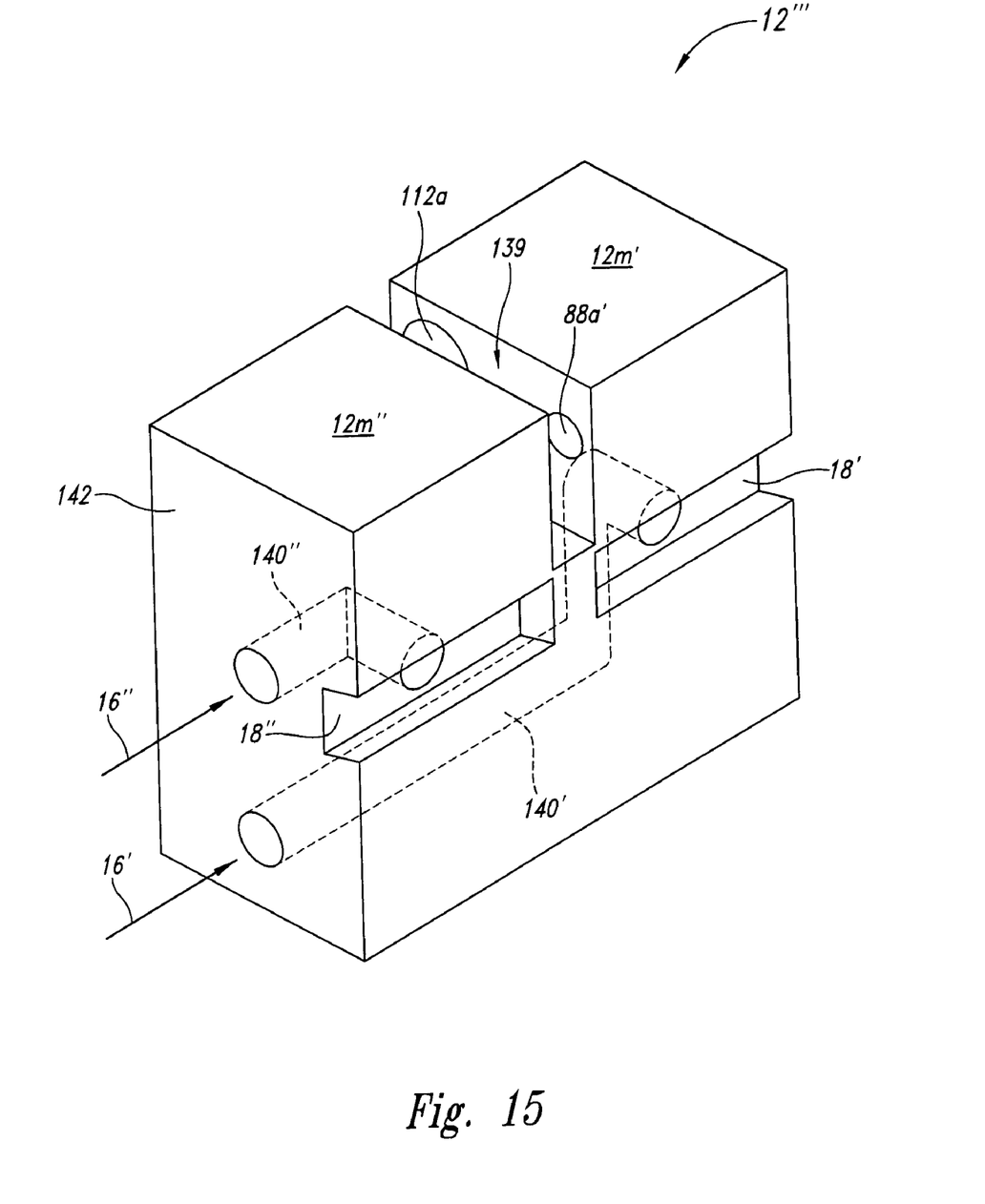
FIG. 15 is an isometric view of the solid body shown in FIG. 13 showing the internal gas passageways.

A modified dual gauge implementation 137 is partially shown in FIGS. 13–15 in which a modified first support 12m' and a modified second support 12m" of a common support 12m'" have other components in common with the implementations of the dual gauge 100 previously described. Instead of using two of the pins 84 found with the implementations of the dual gauge 100 previously described, the implementation 137 has a double pin 138 with a larger diameter pin 84' (used for the modified first support 12m') formed as a single unit with the pin 84 (used for the modified second support 12m"). To receive the larger diameter pin 84', a larger diameter passageway 88a' is located at the first position 88' of the modified first support 12m'.

In the implementation 137, the screw head 94" is located above the screw head 94', which is opposite that for the implementations of the dual gauge 100 previously described. As a consequence, a first bracket 50'" of the modified first support 12m' and a first bracket 50"" of the modified second support 12m" are similarly shaped like the first bracket 50" of the second section and the first bracket 50 of the first section, respectively, of the implementations of the dual gauge 100 previously discussed. For instance, the first bracket 50'" has the elongated passageway 96a in the lower fourth position 96' also found on the first bracket 50".

The first bracket 50'" has a notch N cut away to allow the shaft 90 with the screw head 94" to pass through the access passageway 112a in the modified first support 12m' now located at the second position 98 instead of the third position 112 as found with the first support 12' of the first section 110 of the implementations of the dual gauge 100 previously described. The shaft 90 of the screw head 94' is received by the passageway 98a at the third position 112 rather than the second position 98 as found with the first support 12' of the previously described implementations of the dual gauge 100.

The first bracket 50'''' of the modified second support 12*m*'' is positioned in a slot 139 formed in the common support 12'''. Also in concert with the swapping of positional order of the screw head 94' and the screw head 94'', the first bracket 50'''' has the elongated passageway 96*a* in the fourth position 96.

The common support 12''' includes a first channel 18' and a second channel 18'' for the Bourdon tubes 20 for the first pointer 68' and the second pointer 68'', respectively, as shown in FIGS. 14 and 15. A first internal passageway 140' within the common support 12''' connects the Bourdon tube for the first pointer 68' to the first gas inlet 14' of the first gas 16'. A second internal passageway 140'' within the common support 12''' connects the Bourdon tube for the second pointer 68'' to the second gas inlet 14'' for the second gas 16''.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A gauge comprising:
   a dial face having a first side and a second side, the second side having demarcations, the dial face having a passageway;
   a first gauge portion including:
      a pointer;
      a first member having a longitudinal axis, the first member including a first portion and a second portion, the first member extending along the longitudinal axis from the first portion behind the first side of the dial face through the passageway of the dial face to the second portion in front of the second side of the dial face, the second portion coupled to the pointer, the first portion including a pinion gear;
      a Bourdon tube configured to change shape based on a difference between gas pressure inside and outside of the Bourdon tube;
      a bracket having a location point;
      a lever pivotally coupled to the bracket at the location point, the lever linked to the Bourdon tube for the lever to pivot about the location point of the bracket when the position of the location point remains stationary and the Bourdon tube changes shape, the lever linked to the Bourdon tube for the lever to pivot about the location point when the position of the location point changes and the Bourdon tube retains a shape, the lever including a rack gear coupled to the pinion gear of the first member to rotate the first member about the longitudinal axis as the lever pivots about the location point; and
      a second member coupled to the bracket to move the location point of the bracket as the second member moves; and
   a second gauge portion including:
      a pointer;
      a first member having a longitudinal axis, the first member including a first portion and a second portion, the first member extending along the longitudinal axis from the first portion behind the first side of the dial face through the passageway of the dial face to the second portion in front of the second side of the dial face, the second portion coupled to the pointer, the first portion including a pinion gear;
      a Bourdon tube configured to change shape based on difference between gas pressure inside and outside of the Bourdon tube;
      a bracket having a location point;
      a lever pivotally coupled to the bracket at the location point, the lever linked to the Bourdon tube for the lever to pivot about the location point of the bracket when the position of the location point remains stationary and the Bourdon tube changes shape, the lever linked to the Bourdon tube for the lever to pivot about the location point when the position of the location point changes and the Bourdon tube retains a shape, the lever including a rack gear coupled to the pinion gear of the first member to rotate the first member about the longitudinal axis as the lever pivots about the location point; and
      a second member coupled to the bracket to move the location point of the bracket as the second member moves.

2. The gauge of claim 1 wherein the first member of the first gauge portion is hollow and the first member of the second gauge portion extends through the first member of the first gauge portion.

3. A gauge comprising:
   a dial face having a first side and a second side, the second side having demarcations, the dial face having a passageway;
   a first gauge portion including:
      a pointer;
      a first member having a longitudinal axis, the first member including a first portion and a second portion, the first member extending along the longitudinal axis from the first portion behind the first side of the dial face through the passageway of the dial face to the second portion in front of the second side of the dial face, the second portion coupled to the pointer;
      a Bourdon tube configured to change shape based on a difference between gas pressure inside and outside of the Bourdon tube;
      a motion converter coupled to the Bourdon tube and the first portion of the first member to rotate the first member about the longitudinal axis of the first member when the Bourdon tube changes shape; and
      a second member coupled to the motion converter to rotate the first member about the longitudinal axis of the first member when the second member moves and the Bourdon tube retains a shape; and
   a second gauge portion including:
      a pointer;
      a first member having a longitudinal axis, the first member including a first portion and a second portion, the first member extending along the longitudinal axis from the first portion behind the first side of the dial face through the passageway of the dial face to the second portion in front of the second side of the dial face, the second portion coupled to the pointer;
      a Bourdon tube configured to change shape based on a difference between gas pressure inside and outside of the Bourdon tube;
      a motion converter coupled to the Bourdon tube and the first portion of the first member to rotate the first member about the longitudinal axis of the first member when the Bourdon tube changes shape; and a second member coupled to the motion converter to rotate the first member about the longitudinal axis of the first member when the second member moves and the Bourdon tube retains a shape.

4. A gauge comprising:

a dial face having a first side and a second side, the second side having demarcations, the dial face having at least one passageway;

a first pointer;

a first pointer shaft having first and second open ends to access a passageway, the first pointer shaft extending through the at least one passageway of the dial face and coupled to the first pointer on the second side of the dial face;

a first support having a gas passageway and a gas inlet allowing access to the gas passageway, the first support located behind the first side of the dial face, the first support having a first side facing the dial face and a second side opposite the first side, the first side having an opening and the second side having an opening, the first support having a shaft passageway extending between the opening of the first side and the opening of the second side;

a first Bourdon tube coupled to the first support, the first Bourdon tube having an internal cavity coupled to the gas passageway of the first support;

a first motion converter coupled to the first Bourdon tube and coupled to the first pointer shaft to rotate the first pointer shaft about the longitudinal axis of the first pointer shaft when the first Bourdon tube changes shape, a portion of the first motion converter pivotally coupled to the first support to rotate the first pointer shaft about the longitudinal axis of the first pointer shaft when the first Bourdon tube retains a shape and the portion pivots;

a first calibration shaft having a longitudinal axis, the first calibration shaft extending through the at least one passageway of the dial face from behind the first side of the dial face to the second side of the dial face, the first calibration shaft coupled to the portion of the first motion converter to pivot the pivotally coupled portion of the first motion converter as the first calibration shaft rotates about the longitudinal axis of the first calibration shaft;

a second pointer;

a second pointer shaft extending through the passageway of the first pointer shaft, the second pointer shaft extending through the at least one passageway of the dial face and coupled to the second pointer on the second side of the dial face;

a second support having a gas passageway and a gas inlet allowing access to the gas passageway, the second support located behind the first side of the dial face on the second side of the first support;

a second Bourdon tube coupled to the second support, the second Bourdon tube having an internal cavity coupled to the gas passageway of the second support;

a second motion converter coupled to the second Bourdon tube and coupled to the second pointer shaft to rotate the second pointer shaft about the longitudinal axis of the second pointer shaft when the second Bourdon tube changes shape, a portion of the second motion converter pivotally coupled to the second support to rotate the second pointer shaft about the longitudinal axis of the second pointer shaft when the second Bourdon tube retains a shape and the portion pivots; and a second calibration shaft having a longitudinal axis, the second calibration shaft extending through the passageway of the first support and extending through at the least one passageway of the dial face from behind the first side of the dial face to the second side of the dial face, the second calibration shaft coupled to the portion of the second motion converter to pivot the pivotally coupled portion of the second motion converter as the second calibration shaft rotates about the longitudinal axis of the second calibration shaft.

5. The gauge of claim 4 further including a first tubing coupled to the gas inlet of the first support and a second tubing coupled to the gas inlet of the second support.

6. The gauge of claim 5 wherein the first calibration shaft further includes a cam for coupling with the pivotally coupled portion of the first motion converter and the second calibration shaft further includes a cam for coupling with the pivotally coupled portion of the second motion converter.

7. A gauge comprising:

a dial face having a first side and a second side, the second side having demarcations, the dial face having at least one passageway;

a first pointer;

a first pointer shaft extending through the at least one passageway of the dial face and coupled to the first pointer on the second side of the dial face;

a common support having a first gas inlet, a first opening, a second gas inlet, a second opening, a first gas passageway extending between the first gas inlet and the first opening, and a second gas passageway extending between the second gas inlet and the second opening, the common support located behind the first side of the dial face;

a first Bourdon tube coupled to the common support, the first Bourdon tube having an internal cavity coupled to the first gas passageway through the first opening of the common support;

a first motion converter coupled to the first Bourdon tube and coupled to the first pointer shaft to rotate the first pointer shaft about the longitudinal axis of the first pointer shaft when the first Bourdon tube changes shape, a portion of the first motion converter moveably coupled to the common support to rotate the first pointer shaft about the longitudinal axis of the first pointer shaft when the first Bourdon tube retains a shape and the portion moves;

a first calibration shaft having a longitudinal axis, the first calibration shaft extending through the at least one passageway of the dial face from behind the first side of the dial face of the second side of the dial face, the first calibration shaft coupled to the portion of the first motion converter to move the moveably coupled portion of the first motion converter as the first calibration shaft rotates about the longitudinal axis of the first calibration shaft;

a second pointer;

a second pointer shaft extending through the at least one passageway of the dial face and coupled to the second pointer on the second side of the dial face;

a second Bourdon tube coupled to the common support, the second Bourdon tube having an internal cavity coupled to the second gas passageway through the second opening of the common support;

a second motion converter coupled to the second Bourdon tube and coupled to the second pointer shaft to rotate the second pointer shaft about the longitudinal axis of the second pointer shaft when the second Bourdon tube changes shape, a portion of the second motion converter moveably coupled to the common support to rotate the second pointer shaft about the longitudinal axis of the second pointer shaft when the second Bourdon tube retains a shape and the portion moves; and a second calibration shaft having a longitudinal axis, the second calibration shaft extending through the at least one passageway of the dial face from behind the first side of the dial face to the second side of the dial face, the second calibration shaft coupled to the portion of the second motion converter to move the moveably coupled portion of the second motion converter as the second calibration shaft rotates about the longitudinal axis of the second calibration shaft.

8. The gauge of claim 7 wherein the common support has a first side and a second side opposite the first side, the first side being positioned to face the first side of the dial face, and wherein the first gas inlet and the second gas inlet are on the second side of the common support.

9. The gauge of claim 8 wherein the common support has a shaft passageway extending from the first side of the common support to a mid-portion of the common support and wherein the second calibration shaft extends through the shaft passageway from the first face of the common support to where the second calibration shaft is coupled to the second motion converter.

* * * * *